United States Patent [19]

Cohen et al.

[11] Patent Number: 4,549,385
[45] Date of Patent: Oct. 29, 1985

[54] HANGER FOR SUPPORTING PIPE BELOW STEEL REINFORCED CONCRETE SLAB FOUNDATIONS

[76] Inventors: Alfred S. Cohen, 6125 General Haig, New Orleans, La. 70124; Joseph C. Wessing, Jr., 3405 Blanchard Dr., Chalmette, La. 70043

[21] Appl. No.: 649,916

[22] Filed: Sep. 12, 1984

[51] Int. Cl.⁴ .................... F16L 3/12; E04B 1/00; E02D 27/00
[52] U.S. Cl. .................... 52/742; 52/169.13; 52/170; 52/302; 248/62
[58] Field of Search ............ 52/742, 169.13, 170, 52/169.1, 302, 303; 248/58, 59, 62

[56] References Cited

U.S. PATENT DOCUMENTS

| | | | |
|---|---|---|---|
| 1,362,245 | 12/1920 | Farley | 248/58 |
| 1,670,095 | 5/1928 | Boes | 52/303 X |
| 1,734,777 | 11/1929 | Pike | 52/302 X |
| 1,769,015 | 7/1930 | Carpenter | 248/58 |
| 1,804,420 | 5/1931 | Kelley | 52/741 |
| 3,218,011 | 11/1965 | Ammann | 248/62 |
| 3,236,482 | 2/1966 | Fitzgerald | 248/62 |
| 3,523,515 | 8/1970 | Brown | 248/59 X |
| 3,620,490 | 11/1971 | Roberts | 248/58 |
| 4,486,986 | 12/1984 | Cosenza | 52/303 X |

FOREIGN PATENT DOCUMENTS 26409 11/1906 Austria .
1392237 4/1975 United Kingdom .

Primary Examiner—Stuart S. Levy
Assistant Examiner—Joseph J. Hail, III
Attorney, Agent, or Firm—Pravel, Gambrell, Hewitt & Kimball

[57] ABSTRACT

A hanger for supporting pipes below steel reinforced concrete slab foundations provides an elongated bendable shaft which can be connected to the reinforcing steel of a formed slab foundation prior to the pouring of the concrete. An open loop is secured integrally to the bottom portion of the shaft at a point of beginning, the loop having a curved generally circular body of less than three hundred sixty (360°) degrees which terminates at the point of beginning and at a loop-free end. A radial strut extends from the loop-free end and away from the circular loop along a radial line originating at the loop center. Manual pressure applied to the bottom portion of the shaft and to the radial strut can close the loop by aligning the strut and shaft together in side by side relation. The loop can be closed permanently by a closure ring which can slide upon the aligned portion of the radial strut and elongated shaft so that the loop can be retained in a closed position.

9 Claims, 4 Drawing Figures

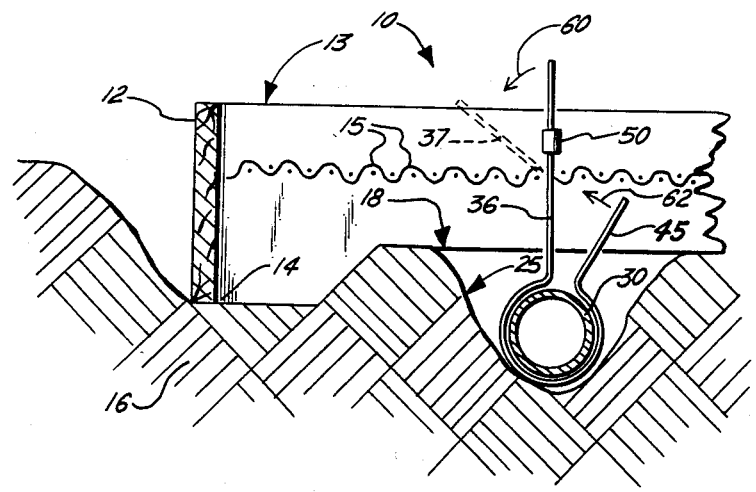
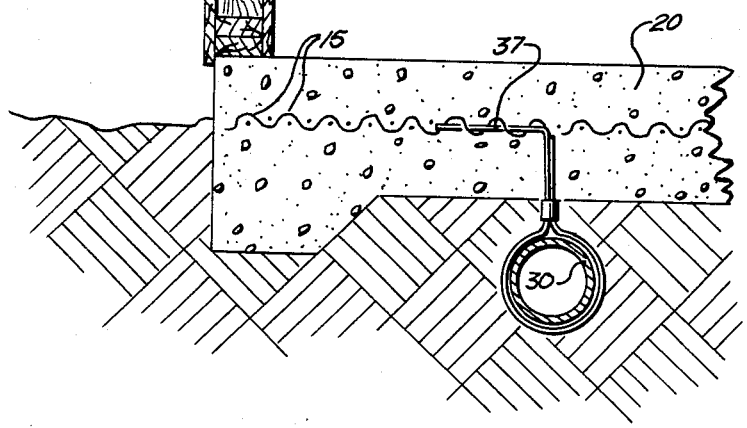
FIG. 1.
FIG. 2.
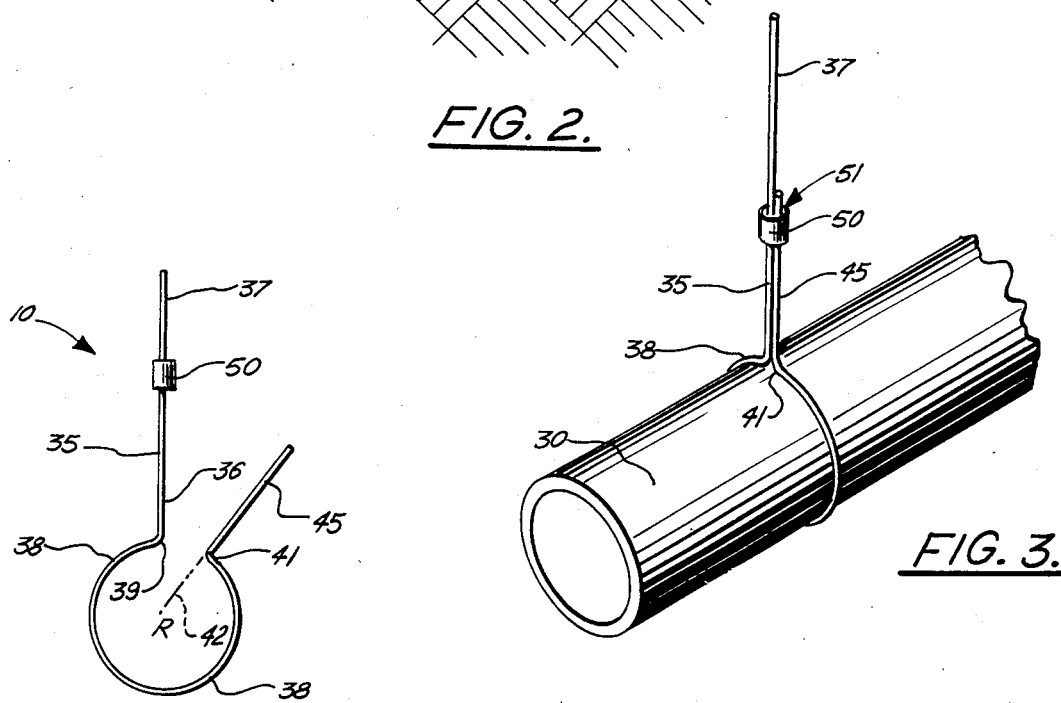
FIG. 3.
FIG. 4.

HANGER FOR SUPPORTING PIPE BELOW STEEL REINFORCED CONCRETE SLAB FOUNDATIONS

BACKGROUND OF THE INVENTION

1. Technical Field

The present invention relates to pipe hangers for use underneath slab foundations of concrete and reinforced steel construction. Even more particularly, the present invention relates to a hanger for supporting pipes underneath concrete slab foundations wherein the hanger is supported by and preliminarily connected to the slab foundation reinforcing steel before concrete is poured.

2. General Background

In the construction of homes, office buildings and other such structures, it is common to use a foundation of reinforced concrete prior to construction of the building superstructure. Most conventional homes, for example, use a four-inch concrete slab which is reinforced with steel reinforcing bars, wire mesh or the like. The use of concrete and reinforcing steel is well-known in the art and documented by building codes of numerous types such as, for example, ALSC and ASTM codes and local and state building codes.

In order to construct a concrete slab foundation, a form is first placed upon the earth at the exact position where the slab will be cast. The form is usually constructed of wood which is temporarily supported in a desired position by a carpenter. The wood defines the horizontal dimensions of the slab as well as the top surface elevation of the slab, usually in a horizontal plane. The lowermost surface of the slab is defined by the underlying earth. Pipes can be mounted under the slab in the underlying earth prior to pouring of the concrete into the foundation form. Reinforcing steel for preventing failure of the slab because of tension can be placed in the space defined by the form prior to a pour. The placement and size of reinforcing steel is normally governed by a building code, or by known engineering standards. The reinforcing steel is usually positioned vertically between the upper and lower limits of the slab such as, for example, two inches below the surface of a four-inch slab.

In some areas, a problem exists where slabs settle or drop in elevation over a period of time. This is a problem in low lying areas, or in areas which have poor soil conditions such as, for example, vegetable matter contained within the underlying soil mass. Other areas simply have a continuous day-to-day, year-to-year drop in the overall soil elevation due to a number of long term geological factors. For example, in swampy and marshy areas, entire cities are slowly dropping in elevation because of the problem of geological soil subsidence. In these cities, buildings must use piling to maintain a proper elevation of the building slab. Piling are used to maintain the slab in a given horizontal position. A problem exists with regard to appurtenances to the structure such as piping, for example. Many homes are supplied with pipes for sewage and drainage. These pipes can settle, crack and produce disasterous consequences such as explosion, fire, loss of property and loss of life. In order to prevent settling of pipes under slab foundations, it is desirable to affix the pipe horizontally with respect to the slab foundation so that the pipeline does not drop in elevation with respect to the slab causing the aforementioned disasterous consequences.

Various devices have been patented as pipe hangers for the affixation of pipes to concrete and concrete-like structures. Note, for example, U.S. Pat. No. 1,362,245 entitled "Hanger Pipe," issued to J. W. Farley on Dec. 14, 1920. In this device there can be seen a pipe hanger which uses a suspensory member made in one piece bent into stirrup form to provide a short leg and a long leg, and a supplemental piece which is fixed to the first member and adapted to anchor the same within a concrete floor.

In U.S. Pat. No. 1,804,420 there is provided a "Ceiling Supporting Strap." In that patent the strap comprises a supported strap, an anchoring strap, means for suspending the supported strap at one side from the lower end of the anchoring strap and a lip formed to extend outwardly from the side of the anchoring strap, the lip being adapted to be bent into a position across the upper end of the supported strap to prevent displacement therefrom.

A pipe hanger is the subject of U.S. Pat. No. 1,769,015. That patent relates to connecting links or hangers which support pipes and other things that are connected or suspended from an overhead support. The hanger uses a bar of metal having provision at one end for attachment to the ceiling and the other end provides a bentback portion forming an eye for engaging the pipe. The bentback portion is locked to the body portion of the eye by a link or band which directly embraces the two. The link maybe an ordinary washer.

U.S. Pat. No. 3,620,490 entitled "Cable Hanger" discloses a cable hanger adapted to fit into a blind hole of a mine roof so as to suspend cable or other power conduit from the roof of a mine. The cable hanger comprises a shaft, bent at one end to form a hook and threaded at the other end for the provision of an expansion shell. The expansion shell consists of an upper relatively immovable member having a smooth axial bore for fitting over the threaded portion of the shaft and a movable lower member containing a smooth axial bore for a slidable fit over the threaded portion of the shaft. Each member has an angularly beveled engaging end surface designed to slide diagonally upwardly and downwardly and laterally or medially over the complementary angularly beveled end surface of the other.

A British Pat. No. 1,392,237 provides a support member including a length of strap metal which is formed into a loop to encircle a set of pipes.

Austrian Patentschrift No. 26409 issued Nov. 10, 1906 shows a hanger having a loop formed in one end portion thereof.

GENERAL DISCUSSION OF THE PRESENT INVENTION

None of the prior art patents disclose in combination a hanger for supporting a pipe below a steel reinforced concrete slab foundation wherein an elongated bendable shaft is connected to the reinforcing steel of the formed slab foundation prior to the pouring of the concrete. The present invention thus allows a pipe to be supported at any level with respect to the slab by bending the top portion of the hanger at right angles to the remaining portion of the hanger so that the top portion of the hanger can be directly attached to reinforcing steel which forms a portion of the slab. With the construction of the present invention, the size of the loop can be made to handle any size of pipe, and the length of the shaft can be constructed for any depth. By elongating the shaft portion of the device, the device can be designed to both: (1) provide enough length on the shaft for attachment to the reinforcing steel, and (2) to fully "develop" the shaft in the concrete so that the hanger will not easily pull out of the concrete under a load which tends to pull the pipe and slab apart.

In the preferred embodiment the shaft, loop and strut portions of the hanger are integrally formed of a constant cylindrical uniform diameter. In the preferred embodiment, the upper portion of the shaft is positioned to be encapsulated in the concrete after the concrete is poured into the formed slab foundation. A closure in the form of a hollowed coupling having retaining walls can be freely slid over the shaft and the strut when they are manually aligned by a plumbing, for example.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a sectional view illustrating the preferred embodiment of the apparatus of the present invention and its attachment to the reinforcing steel of a slab foundation as formed and prior to the concrete pour;

FIG. 2 is a sectional view illustrating the preferred embodiment of the apparatus of the present invention after concrete has been poured in the form and illustrating attachment of the apparatus to both the reinforcing steel and to the surrounding concrete;

FIG. 3 is a perspective view illustrating the preferred embodiment of the apparatus of the present invention as assembled around a pipe to be supported; and FIG. 4 is an elevational view of the preferred embodiment of the apparatus of the present invention as removed from its operating position and showing the open loop in its open, nonuse position.

DETAILED DESCRIPTION OF THE PREFERRED EMBODIMENT

FIGS. 1-4 best show the preferred embodiment of the apparatus of the present invention designated generally by the numeral 10.

In FIG. 1 there can be seen a form 12 of wood, for example, extending from a top surface 13 to a bottom surface 14 which communicates with an underlying soil mass 16. Form 12 extends laterally above soil mass 16, the exact dimensions of the slab to be poured. The upper surface 18 of soil mass 16 within the confines of form 12 defines the lower surface of the slab 20 which eventually will be poured into the confines of form 12. The upper surface 13 of form 12 defines the upper surface of slab 20 (see FIG. 2) after a pour has been completed.

An elongated trench 25 is formed in the underlying soil mass 16 and below the surface 18. Trench 25 will be occupied by a pipe 30 to be placed underneath form 12 and slab 20 as can best be seen by FIGS. 1 and 2.

In FIG. 1, hanger 10 is shown in a position before the slab is poured. Hanger 10 provides support for pipe 30 so that it does not sink with respect to slab 20 but rather is structurally affixed to it.

FIGS. 3 and 4 show more particularly the construction of hanger 10 and its assembly to pipe 30. In FIG. 4, hanger 10 is shown as including an elongated bendable shaft 35 which can be connected to the reinforcing steel 15 of the formed slab foundation 20 prior to the pouring of concrete thereinto. Shaft 35 has an exemplary diameter of $\frac{1}{8}''-\frac{3}{8}''$. A lowermost open loop 38 is secured integrally to the bottom portion 36 of shaft 38 at a point of beginning designated as 39 in FIG. 4. The loop has a curved, generally circular body of less than three hundred and sixty (360°) degrees which terminates at the point of beginning 39 and at a loop free end 41. A radial strut 45 extends from the loop free end 41 and away from the circular loop body 38 along a radial line 42 originating at the loop center R. A loop closure ring 50 secures the radial strut and the lower portion 36 of elongated shaft 35 so that the loop can be closed as best seen in FIGS. 2 and 3. Closure 50 can be a cylindrical member having an interior bore 51 which is larger than the combined cross-sectional dimensions of strut 45 and lower portion 36 of shaft 35. Elongated shaft 35 provides upper 37 and lower 36 portions which can be connected to reinforcing steel 15 by means of intertwining the reinforcing steel 15 with the upper portion 37 of shaft 35 as best seen in FIG. 2. This connection is formed after a preferably ninety (90°) degree or right angle bend is made in shaft 35 at a point selected by the plumber that is installing the hanger. FIG. 1 schematically shows with arrow 60 the bending of upper portion 37 of shaft 35 with respect to the lower portion 36 thereof so that upper portion 37 can be intertwined with reinforcing steel 15 as shown in FIG. 2. By bending the upper portion of hanger shaft 35 in this way, two problems are solved. Firstly, the elevation of pipeline 30 with respect to slab 20 can be fixed at a desired dimension. Secondly, the shaft 35 can be "developed" into the concrete a dimension which is known so that a predictable load value can be calculated for the hanger 10.

Radial strut 45 is preferably integrally connected to loop 38 as is hanger shaft 35. The entire hanger 10 would be constructed of stainless steel, for example, or other suitable flexible yet structurally strong material having flexibility and ductility. Movement of strut 45 away from shaft 35 would open loop 38 so that a pipe 30 to be supported could be inserted into the loop. The plumber would then bring the struct 45 and shaft 36 together as shown by the arrow 62 in FIG. 1. When strut 45 and shaft 36 are aligned, closure 50 is placed over the two aligned members 35, 41 as shown in FIG. 3.

From the above discussion, it is clear that the present invention provides a hanger which can be placed in position prior to the pouring of concrete. No additional bolting or drilling is required in order to attach the hanger 10 to the concrete slab 20. Additionally, the present invention provides a means for attaching the hanger to the reinforcing steel of the slab so that it is fully supported in position prior to the pour.

The present invention also provides a hanger which allows a fully developed load carrying hanger of great structural integrity to support the pipe after a pour has been completed. The apparatus thus disclosed uses the slab itself to both support the pipe for moving away from the slab and uses the concrete in the slab to hold the loop in a closed position after the pour has been completed.

Because many varying and different embodiments may be made within the scope of the inventive concept herein taught, and because many modifications may be made in the embodiments herein detailed in accordance with the descriptive requirement of the law, it is to be understood that the details herein taught are to be interpreted as illustrative and not in a limiting sense.

What is claimed as the invention is:

1. A method for installing pipe below a slab formed of steel reinforced concrete, comprising:
   a. securing an elongated shaft of a preformed hanger to a reinforced steel portion of the formed slab foundation prior to the pouring of concrete;
   b. preforming a hanger having an open loop at the bottom portion of an elongated shaft, the loop having a curved, generally circular body of less than three hundred sixty degrees (360°) which terminates at a point of beginning communicating with the shaft and a loop free end which includes a radial strut extending from the loop free end and away from the circular loop along a radial line originating at the loop center;
   c. placing the pipe to be supported in the preformed loop after the shaft is secured to the reinforcing steel so that the pipe is preliminarily supported by the reinforcing steel with the preformed hanger;
   d. closing the loop by connecting the radial strut and the hanger shaft together; and
   e. pouring the concrete portion of the slab so that it encapsulates both the reinforcing steel and at least the portion of the hanger shaft above the loop.

2. The method for installing pipe of claim 1, wherein the shaft, loop and strut are integrally formed.

3. The method for installing pipe of claim 1, wherein the elongated shaft has upper and lower portions, and there if further included means for angularly connecting the elongated shaft upper portion to the reinforcing steel of the slab so that the upper portion of the shaft occupies a position parallel with the plane of the reinforcing steel, and the lower portion of the shaft is at right angles thereto.

4. The method for installing pipe of claim 3, wherein all of the upper portion of the shaft is positioned to be encapsulated in concrete after concrete is poured into the formed slab foundation.

5. The method for installing pipe of claim 4, wherein the lower portion of the shaft is partially encapsulated in concrete after concrete is poured into the formed slab foundation.

6. The method for installing pipe of claim 1, wherein the closure means is a hollowed coupling having retaining walls which can freely slide over the shaft and strut when they are manually aligned.

7. The method for installing pipe of claim 2, wherein the shaft, loop and strut each have corresponding circular cross-section.

8. The method for installing pipe of claim 6, wherein the shaft, loop, and strut are metallic.

9. The method for installing pipe of claim 1, wherein the loop upon assembly is generally bisected by a line extending linearly of the lower portion of the shaft.

* * * * *